(12) United States Patent
Cattaneo (10) Patent No.: US 10,512,329 B2
(45) Date of Patent: Dec. 24, 2019

(54) ANCHORING GROUP FOR WALL CUPBOARDS WITH FACILITATED ASSEMBLY

(71) Applicant: Leonardo S.r.l., Figino Serenza (CO) (IT)

(72) Inventor: Carlo Cattaneo, Figino Serenza (IT)

(*) Notice: Subject to any disclaimer, the term of this patent is extended or adjusted under 35 U.S.C. 154(b) by 0 days.

(21) Appl. No.: 15/751,611

(22) PCT Filed: Sep. 14, 2016

(86) PCT No.: PCT/EP2016/071707
§ 371 (c)(1),
(2) Date: Feb. 9, 2018

(87) PCT Pub. No.: WO2017/046171
PCT Pub. Date: Mar. 23, 2017

(65) Prior Publication Data
US 2018/0228288 A1      Aug. 16, 2018

(30) Foreign Application Priority Data
Sep. 17, 2015   (IT) .................. 102015000052531

(51) Int. Cl.
*A47B 95/00* (2006.01)
*F16H 1/16* (2006.01)

(52) U.S. Cl.
CPC .... *A47B 95/008* (2013.01); *A47B 2220/0002* (2013.01); *F16H 1/16* (2013.01)

(58) Field of Classification Search
CPC . A47B 95/008; A47B 2220/0002; F16H 1/16; F16B 12/2027; F16B 12/2063
See application file for complete search history.

(56) References Cited

U.S. PATENT DOCUMENTS

| 942,170 | A | * | 12/1909 | Dunlap | |
|---|---|---|---|---|---|
| 5,547,330 | A | * | 8/1996 | Walimaa | F16M 11/043 269/71 |

FOREIGN PATENT DOCUMENTS

| DE | 202017102027 U1 | * | 5/2017 | ............... F16H 1/16 |
|---|---|---|---|---|
| EP | 0555924 A1 | * | 8/1993 | ........... A47B 95/008 |
| EP | 3184713 A1 | * | 6/2017 | |
| EP | 3248505 A1 | * | 11/2017 | |
| WO | WO-2005115199 A1 | * | 12/2005 | ........... A47B 91/028 |
| WO | WO-2008129381 A2 | * | 10/2008 | ........... A47B 95/008 |
| WO | 2012048850 | | 4/2012 | |
| WO | WO-2012048850 A1 | * | 4/2012 | ............ E04F 13/083 |
| WO | 2012140467 | | 10/2012 | |

* cited by examiner

*Primary Examiner* — Kimberly T Wood
(74) *Attorney, Agent, or Firm* — Themis Law (57) ABSTRACT

An adjustable anchoring group for the wall assembly of wall-cupboards includes a hanging bracket device, provided with an anchoring base to a wall-cupboard and a hooking element; an anchoring support to a wall; a regulation system; and an actuation system of the reciprocal position between the hanging bracket device, the hooking element and the anchoring support to effect a regulation in the position of the wall-cupboard with respect to the wall, according to two directions perpendicular to each other. Both the regulation member and the actuation member are accessible from both below and above for controlling both the regulation member and the actuation member from both sides.

9 Claims, 6 Drawing Sheets

ANCHORING GROUP FOR WALL CUPBOARDS WITH FACILITATED ASSEMBLY

The present invention relates to an anchoring group for the wall assembly of wall cupboards with facilitated assembly.

At present, the definition "anchoring group" generally indicates the combination of a plate (support), that can be fixed to the wall by means of screws and/or dowels, and an anchoring device (so-called hanging bracket) comprising a hook that can be fixed to the furniture.

Furthermore, for a better understanding of the problems associated with anchoring groups and their application, it should also be pointed out that wall cupboards are usually provided with a rear wall, called "lining", which typically consists of a plywood panel or made of thin wood.

As is known, the lining simply has an aesthetical function for closing the back of the cupboard, and cannot have any significant structural or bearing function.

Its thickness is in fact too thin for hanging the wall cupboard by fixing the hanging bracket to the same alone. A solution to the problem therefore lies in the fact that the hanging bracket of the anchoring group must be mainly fixed to structural parts of the cupboard, such as for example, the side shoulders, which, on the other hand, are produced with a load-bearing function, having an adequate thickness and resistance for the purpose, sometimes supported by a fixing also to the upper top of the cupboard.

This type of application, however, is not suitable when the wall cupboard does not have a particularly sturdy structure.

In this situation of thin panelling, moreover, the anchoring groups used must be able to be regulated, in the sense that the hanging bracket, or rather its parts, must be movable with respect to the supporting point to allow a regulation in height (vertical) and also in depth (horizontal).

Only in this way is it possible to position the cupboard correctly on the wall, also with respect to other adjacent furniture.

Furthermore, also in this situation of a thin structure of the cupboard, the anchoring groups must not have complex mechanisms or be difficult to activate, in any case preventing their regulation in height and depth from being difficult to implement.

A further problem connected with the positioning of these wall cupboards lies in the need for holes in the lining and/or panels, to allow the passage of a tool that effects horizontal and vertical adjustments.

Holing of the lining and/or panels in visible positions is not desirable, as the wall cupboard, for example, has a certain value and must not be ruined by making holes that can be easily seen by an observer, even if covered by specific caps, in particular, in the case of furniture that does not have closing doors, or provided with partially transparent doors, in which the holes and/or relative caps formed in the lining, are visible.

Finally, the problem, already partly indicated, relating to the not always easy accessibility of the regulation means and actuation means of the reciprocal position between the hanging-bracket device, the hooking element and the anchoring support, should not be overlooked. It is these means, in fact, that allow the position of the wall-cupboard to be adjusted with respect to the wall according to two directions perpendicular to each other, vertically (height) and horizontally (depth) respectively. This problem at times only emerges with certainty in the assembly phase of the wall cupboard and which at the moment can only be solved by availing of various types of hanging-bracket solutions depending on the accessibility of the wall cupboard itself from below or above.

WO 2012/14467 A1 and WO 2012/048850 relate to anchoring groups in which the adjustment means and actuation means can only be reached and controlled from above.

The objective of the present invention is therefore to overcome the drawbacks previously indicated.

A further objective of the present invention is to avail of an anchoring group that is suitable for any assembly condition and accessibility of the regulation and actuation means indicated above, reducing the number of anchoring solutions available.

Furthermore, the present invention is proposed as an alternative to the known anchoring groups and already present on the market, in particular when the panels of the cupboard are thin.

In view of the above objectives, according to the present invention, an anchoring group has been conceived for the wall assembly of wall cupboards with facilitated assembly having the characteristics specified in the enclosed claims.

The structural and functional characteristics of the present invention and its advantages with respect to the known art will appear even more evident from the following description, referring to the enclosed drawings, which show embodiment examples of an anchoring group produced according to the present invention.

Figure 1:
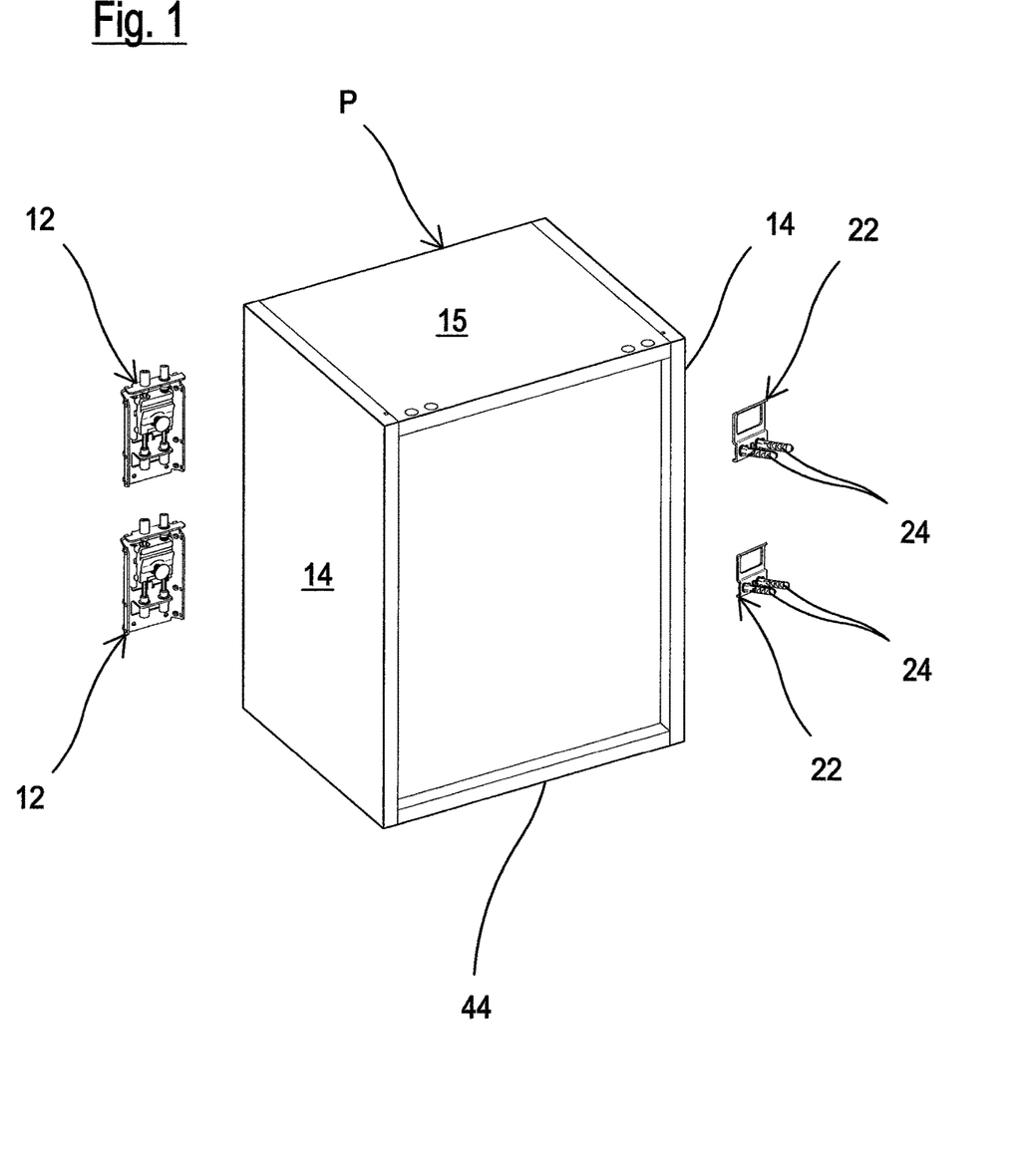
FIG. 1 shows a perspective view of a wall cupboard and relative anchoring groups complete with hanging bracket and wall support in an exploded view in a non-limiting embodiment, according to the present invention, in which the wall cupboard receives said pair of hanging brackets and the wall supports are separate from each other and must be fixed to the wall individually spaced.
Figure 2:
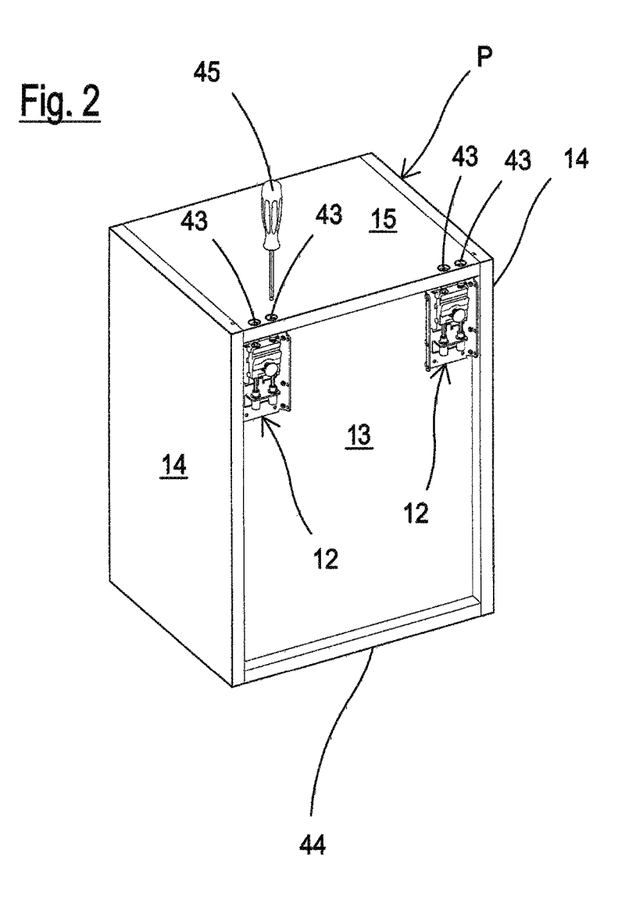
FIGS. 2 and 3 show perspective views of the wall cupboard with the hanging brackets of the group of the invention fixed to it, to which access can be obtained in the first case from above and in the second case from below depending on the availability and accessibility in the wall adjustment phase.
Figure 3:
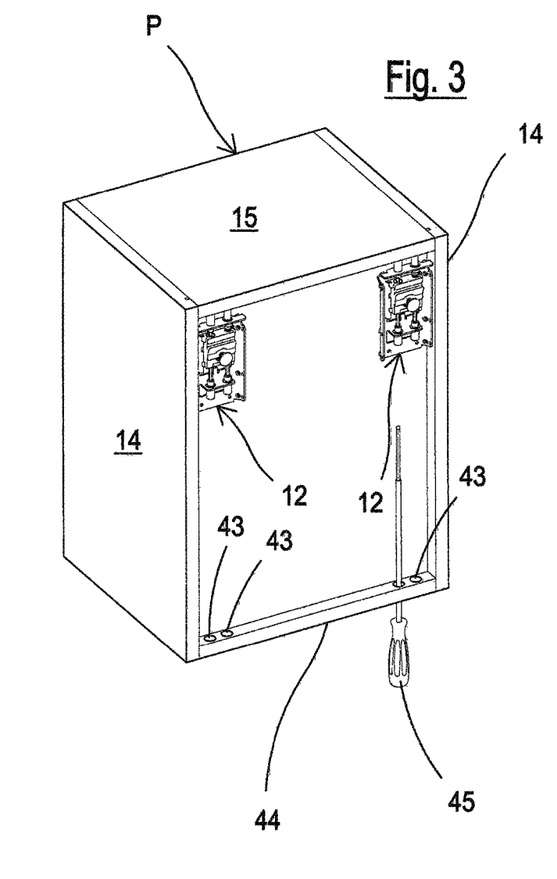
Figure 4:
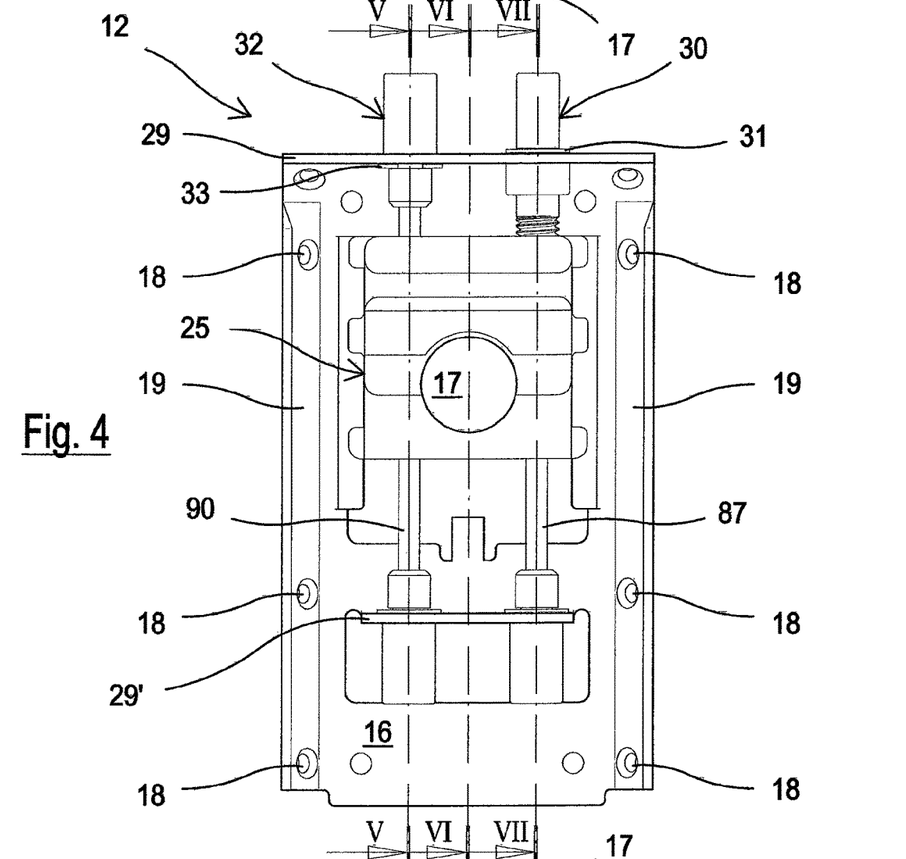
FIGS. 4, 5, 6 and 7 show an example of a hanging bracket for an anchoring group of the invention in a front view, and in various views according to the lines V-V of FIG. 4, VI-VI of FIG. 4 and VII-VII of FIG. 4, respectively.
Figure 5:
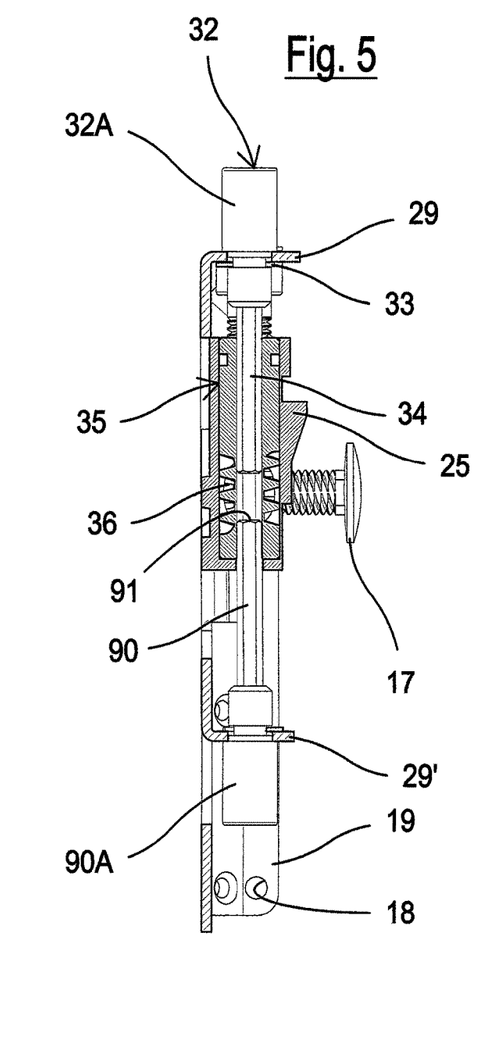

With particular reference to FIGS. 1, 2 and 3, these show an embodiment example of an anchoring group with facilitated assembly according to the invention comprising a pair of hanging-bracket devices 12, that can be constrained to a wall cupboard P, and a pair of supports or supporting plates 22 to be fixed to a wall (not shown) by means of fixing dowels 24.

Figures 10, 11, 12:
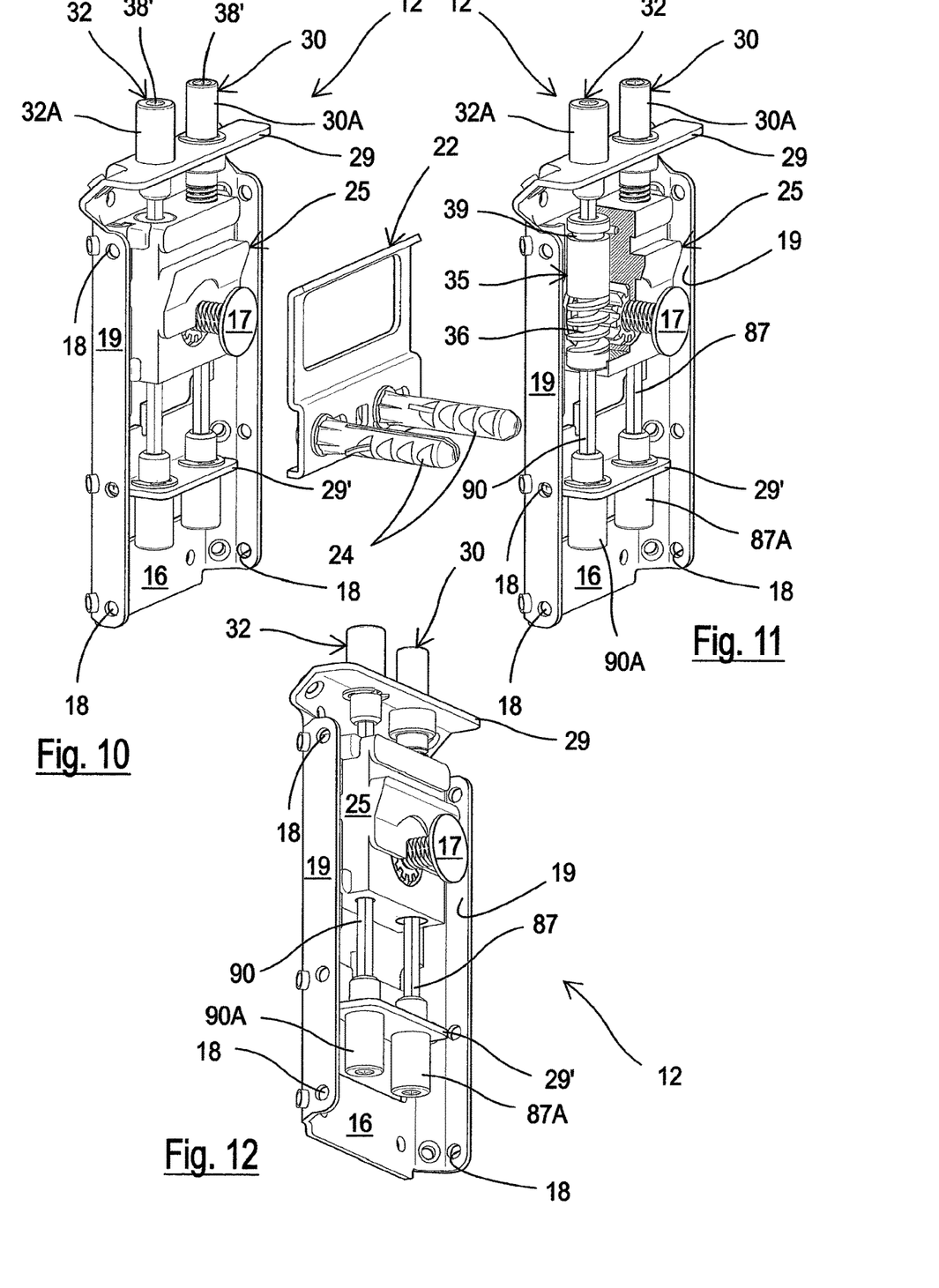
FIG. 10 is an exploded perspective view of a hanging bracket of the anchoring group according to the present invention, and a wall support such as those shown in FIG. 1.
FIG. 11 is a partially split and sectional perspective view of the hanging bracket of FIG. 10.
FIG. 12 is a perspective view of the hanging bracket of FIG. 10 according to a different angle.
Figure 13:
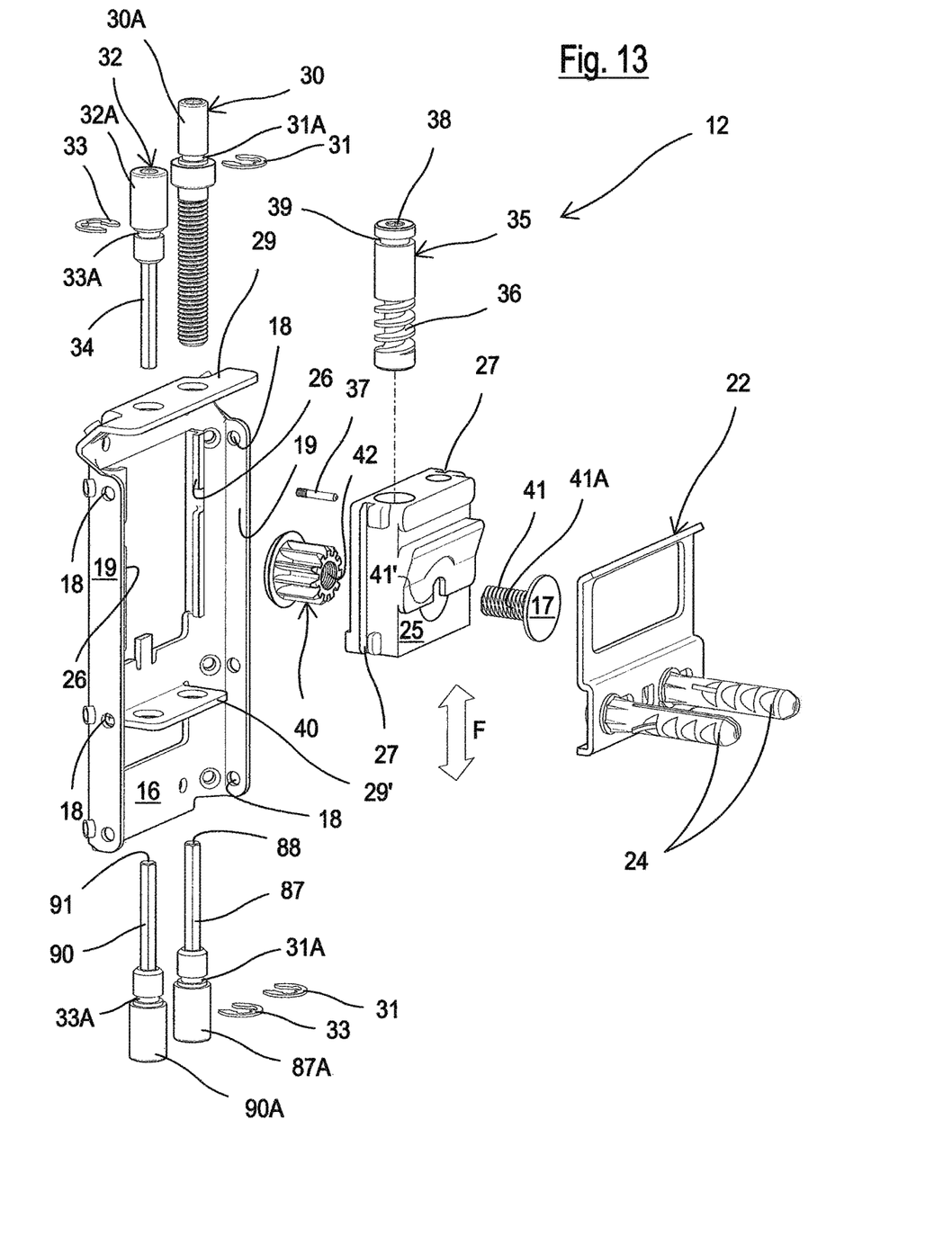
FIG. 13 is a perspective view of the hanging bracket of FIG. 10, exploded in its details, and the wall support, forming the anchoring group according to the present invention.

According to the invention, this kind of anchoring group 11 comprises a pair of hanging-bracket devices 12 and a pair of supporting plates 22, such as those shown in the non-limiting example of FIGS. 10 and 13.

FIGS. 2 and 3 also show how the pair of hanging-bracket devices 12 are arranged at the rear of the wall cupboard P, in a hidden position, in contact with a lining 13, laterally constrained to a shoulder 14 and possibly above a top 15 of the wall cupboard P.

In the embodiment shown in the various figures, which are non-limiting, each hanging-bracket device 12 comprises an anchoring base or plate element 16 and a hooking element 17. The plate element 16 is provided with a plurality of fixing holes 18, formed laterally on both sides of the raised edges 19 of the plate element 16 itself, to constrain it to one of the shoulders 14.

The hooking element 17 is coupled in the front with the same plate element 16 to constrain the hanging bracket 12 itself to the plate or bar or similar supporting element 22, indicated above.

Figure 6:
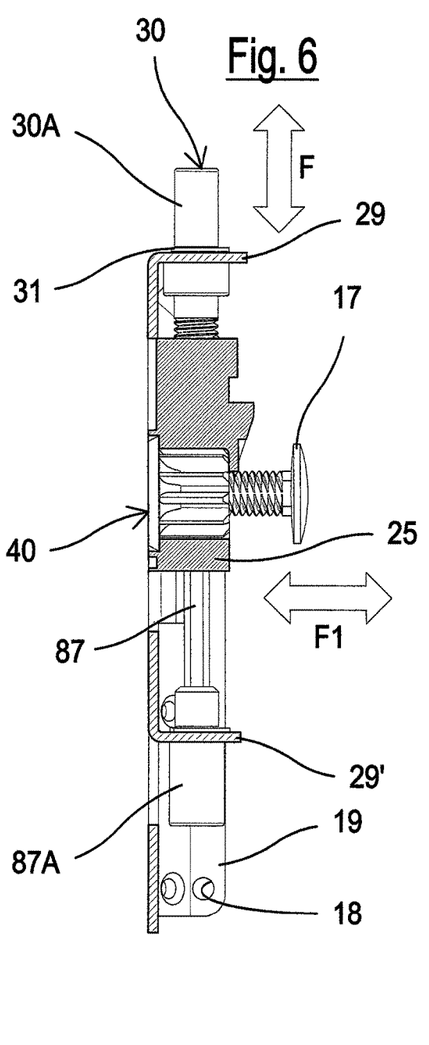
Figure 7:
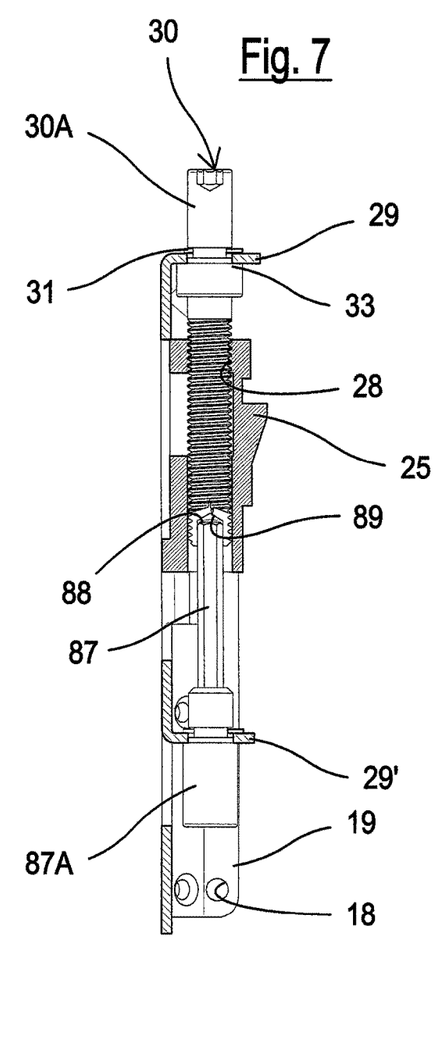
Figure 8:
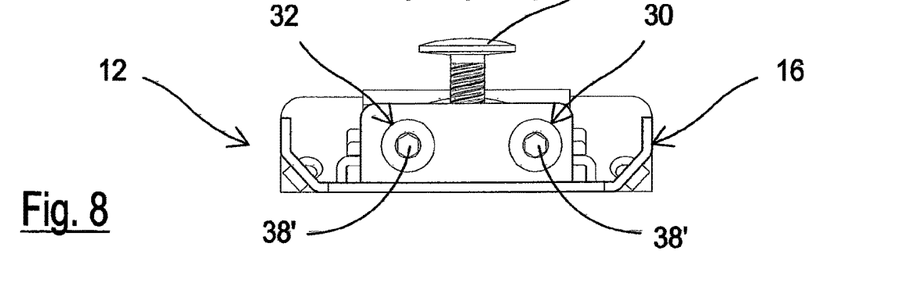
FIGS. 8 and 9 show a view from above of the hanging bracket of FIG. 4 and a view from below of the hanging bracket of FIG. 4, respectively.
Figure 9:
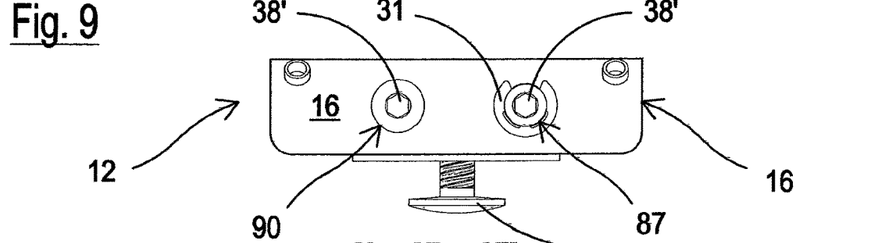

Each hanging bracket 12 comprises a slide 25, that slides linearly with respect to the plate element or flange 16 in a first direction F, whereas the hooking element 17 is at least partially associated with the slide 25. The hooking element 17 can in fact be moved with respect to the slide 25 in at least a second direction F1, substantially perpendicular with respect to the first direction (FIG. 6).

In this way, a regulation of the wall cupboard P is obtained in two directions F, F1, perpendicular to each other, specifically vertically (in height) and horizontally (in depth).

Each plate element or flange 16 also comprises at least two sliding rails 26 that cooperate with the relative slide 25. The slide 25 provides sliding guides destined for cooperating with the respective rails 26 for guiding the sliding of the slide 25 in the first direction, preferably vertically in an assembled condition, this direction being substantially perpendicular to the axis of the side fixing holes 18.

Furthermore, the anchoring group comprises regulation means for controlling the sliding of the slide 25 with respect to the plate element or flange 16.

These means preferably comprise: a threaded seat 28 formed in the slide 25, a pair of upper 29 and lower 29' abutment flaps, provided with a pair of holes and integral with the plate element 16, which extend perpendicularly to the rails 26, and a regulation screw that cooperates with the threaded seat 28 of the slide 25 through its threaded free end.

According to the invention, said regulation screw 30 must be accessible from both above and below to allow it to be controlled from both of these sides.

Consequently, in this embodiment, first of all, the regulation screw 30, accessible from above, also cooperates with the upper abutment flap 29. This cooperation, together with that of the threaded seat 28, is such as to effect the sliding of the slide 25 in the first direction F indicated above, when actuated from above.

Secondly, a manoeuvring pivot 87 of the regulation screw 30 is provided, accessible from below, which in turn cooperates with the lower abutment flap 29' and is inserted in one of its free shaped ends 88 into a blind hole 89, complementarily shaped with respect to the free shaped end 88, said blind hole 89 being formed in the facing end of the regulation screw 30.

Both the regulation screw 30 and the manoeuvring pivot 87 are kept firmly in position with respect to the upper 29 and lower 29' abutment flaps, but are free to rotate. This is possible thanks to the provision of a blocking ring 31, such as a Seeger ring, which is housed in an annular seat 31A situated below a head 30A of the regulation screw 30 and 87A respectively of the manoeuvring pivot 87. In this way, the regulation screw and the manoeuvring pivot 87 are thus firmly constrained to the flaps 29, 29', but free to rotate.

The regulation screw 30 has been described in the upper part of the hanging bracket and the manoeuvring pivot 87 in the lower part, but their arrangement can be identically reversed.

Furthermore, each hanging bracket device 12 comprises actuation means for controlling the movement of the hooking element 17 in the second direction F1. In particular, in the example shown, said actuation means comprise a drive screw 32, accessible from above, at least partially housed in the slide 25 and arranged parallel to the regulation screw 30.

According to the invention, said drive screw 32 must however be accessible from both above and below to allow it to be controlled from both sides.

Consequently, in this embodiment, in the first place, the drive screw 32 is also kept firmly in position with respect to the upper abutment flap, but rotatable, thanks to the provision of a blocking ring 33, such as a Seeger ring, which is housed in an annular seat 33A formed beneath its head 32A which is thus stably constrained to the flap 29, but free to rotate.

More specifically, in this example, said actuation means not only comprise the drive screw 32, provided with a polygonal stem 34, for example hexagonal, but also a cylindrical element 35, produced externally in a portion in the form of a worm-screw 36, and housed in the slide 25, kept rotatingly in position by a pin 37.

The cylindrical element 35 is internally and axially provided with a shaped pass-through hole 38, in this case having a polygonal form complementary to that of the stem 34 of the drive screw 32.

The pin 37 is inserted, in an assembled condition, in the slide 25 and then also in the throat 39 of the cylindrical element 35.

The portion in the form of a worm screw 36 of the cylindrical element 35 cooperates with a toothed wheel 40, also housed in the slide 25 and rotatingly withheld with respect to the same.

The hooking element 17 is provided with a threaded body 41 cooperating with a threaded seat 42 inside the toothed wheel 40.

The body 41 has two smooth opposite planes (or flat portions) (41A) that slide inside complementary guiding seats 41' defined on the slide 25.

As said drive screw 32, moreover, according to the invention, must be accessible not only from above but also from below, in order to allow it to be controlled from both sides, a further arrangement is provided. A further manoeuvring pivot 90 of the drive screw 32, is in fact provided, accessible from below, which in turn cooperates with the lower abutment flap 29'. One of its shaped free ends 91, for example polygonal, is, in fact, inserted in the pass-through hole 38, complementarily shaped, which, as already indicated, is formed in the cylindrical element 35.

Both the drive screw 32 and the further manoeuvring pivot 90 are kept firmly in position with respect to the upper 29 and lower 29' abutment flap, but they are free to rotate. This is possible thanks to the provision of a blocking ring 33, such as a Seeger ring, which is housed in an annular seat 33A formed beneath a head 90A of the drive screw 32 and the further manoeuvring pivot 90 respectively. Analogously to what has been indicated for the regulation screw 30, in this way, the drive screw 32 and the further manoeuvring pivot 90 are thus stably constrained to the flaps 29, 29', but free to rotate.

The drive screw 32 has been described in the upper part of the hanging bracket and the further manoeuvring pivot 90 in the lower part, but their arrangement can be identically reversed.

From what has been specified above, it can be immediately seen that the body 41 of the hooking element 17 can be moved horizontally, in an extraction/insertion direction according to the arrow F1, from the toothed wheel 40 following the rotation of the latter, when actuated by the portion in the form of a worm screw 36 of the cylindrical element 35.

As can be seen in the figures, the axes of the portion in the form of a worm screw 36 of the cylindrical element 35, of the drive screw 32 and regulation screw 30 are parallel to each other, so that access by means of keys or screwdrivers for effecting regulations of the wall cupboard P can be obtained by acting from the same part, i.e. directly from above or from below thanks to the presence of two manoeuvring pivots 87 and 90 connected to the regulation screw 30 and to the drive screw 32 respectively.

It should also be noted that analogously to the hole 38, housings 38' in the head of the regulation screw 30, in the head of the manoeuvring pivot 87, in the head of the drive screw 32 and in the head of the further manoeuvring pivots 90, are also provided, all housings being suitable for receiving, as can be seen hereunder, the tip of a screwdriver or rotation key.

FIGS. 4 to 13 all clearly show the elements of this embodiment of a hanging bracket used in the anchoring group according to the invention.

It can be immediately understood, however, that the hanging bracket or its mechanisms can be produced in various alternative embodiments, provided they allow actuation of the means provided therein, from both below and above.

At this point, FIGS. 2 and 3 very clearly show how this type of anchoring group can be actuated as possible from the assembly conditions and arrangement of the wall cupboard P.

FIG. 2, in fact, shows how there is the possibility of effecting regulation from above, for example by means of pass-through holes 43 formed in the top 15 of the wall cupboard P.

FIG. 3 analogously shows how the regulation can be effected from below, for example by means of pass-through holes 43 formed in a base or shelf 44 of the wall cupboard P.

This is all obtained through an analogous arrangement of the hanging bracket and furthermore of the same type.

This allows the installer to optimize access to regulations and allow the assembly of hanging brackets of a single type, of a universal type, i.e. belonging to the anchoring group of the present invention.

The necessity of having to avail of different types of hanging brackets having only either regulation from below or regulation from above, is eliminated.

Furthermore, the presence of front pass-through holes on the lining, which are aesthetically unsightly, has in any case been avoided, and it is possible to act from the rear part of the wall cupboard without affecting the overall aesthetical appearance.

The possibility of acting equivalently from below or from above makes it possible to operate either with a ladder or directly from the floor without any further help.

In this way, the horizontal and vertical movement of the wall cupboard P can be advantageously regulated by indifferently acting either from below or from above, and by simply acting with a screwdriver 45, as illustrated in FIGS. 2 and 3 that show accessibility to the single hanging bracket 12 using a screwdriver 45 alternatively introduced into one of the two holes 43 formed in either the top 15 or in the base 44.

Consequently, according to the present invention, an anchoring group is provided in which the hanging bracket is fixed to the wall cupboard P whereas the anchoring supports such as plates or a single bar are constrained to the wall or panel with ample accessibility and safety also in the presence of particularly thin panels, top, shoulder and base.

It is therefore reiterated that each anchoring group according to the invention comprises regulation means and actuation means of the reciprocal position between the hanging-bracket device 12, the hooking element 17 and the anchoring support 22 to effect a regulation in the position of the wall cupboard P with respect to the wall 23. Said regulation is effected in two directions F, F1, perpendicular to each other, vertically (in height) and in horizontally (in depth) respectively and the regulation and actuation are advantageously effected from above.

The implementation of the adjustments in depth and in height are therefore very practically effected directly from below or from above with a screwdriver obtaining an extremely simplified and universal assembly.

Finally, all problems relating to the presence of visible holes in the elements of the wall cupboard and/or closing caps of the same holes, have been eliminated.

In this way, the problems revealed in the prior art have been solved.

Further variants, or equivalent modifications are also possible, all to be considered as being included in the scope of the present invention.

The scope of the invention is therefore defined by the following claims.

The invention claimed is:

1. An adjustable anchoring group for a wall assembly of wall-cupboards, comprising:
    a hanging bracket device having an anchoring base adapted to be affixed to a wall-cupboard and a hooking element coupled to the anchoring base; and
    an anchoring support to a wall,
    wherein the hanging bracket device comprises a regulation system and an actuation system that adjust a reciprocal position of the hanging bracket device, the hooking element, and the anchoring support so as to obtain a regulation in a position of the wall-cupboard with respect to the wall along two perpendicular directions, which include a first direction parallel to the wall and a second direction perpendicular to the wall, and
    wherein both the regulation system and the actuation system are configured to be accessible both from above and from below the hanging bracket device after the hanging bracket device is affixed to the wall-cupboard,
    wherein the hanging bracket comprises a slide that slides linearly with respect to the anchoring base in the first direction by action of the regulation system, and wherein the hooking element is at least partially engaged in the slide and movable with respect to the slide in at least the second direction by action of the actuation system,
    wherein the slide comprises sliding guides that enable sliding in the first direction, and wherein the anchoring base comprises fixing holes that provide access to a shoulder of the wall-cupboard and further comprises sliding rails defined on the slide, the sliding guides and the sliding rails being adapted to cooperate with each other to guide the sliding of the slide in the first direction, wherein the regulation system comprises:

a first threaded seat formed in the slide;

a first abutment flap integral with the anchoring base and extending perpendicularly to the sliding direction; and a regulation screw having an upper end accessible from above the hanging bracket device, the regulation screw cooperating with the first abutment flap and with the first threaded seat to cause the sliding of the slide in the first direction; and a first maneuvering pivot cooperating with a second abutment flap integral with the anchoring base, the first maneuvering pivot having an upper end that engages a lower end of the regulation screw and a lower end that is controllable from below the hanging bracket, wherein both the regulation screw and the first maneuvering pivot are in a fixed position along the first direction but are each rotatable, whereby a rotation of the regulation screw causes a rotation of the first maneuvering pivot and vice versa.

2. The adjustable anchoring group according to claim 1, wherein the actuation system is controlled from above the hanging bracket device by accessing the actuation system through holes defined in a top of the wall-cupboard, and wherein the actuation system is controlled from below the hanging bracket device by accessing the actuation system through holes defined in a base of the wall-cupboard.

3. The adjustable anchoring group according to claim 1, wherein the regulation system is adapted to control a sliding of the slide with respect to the anchoring base both from above and from below the hanging bracket device after the hanging bracket device is affixed to the wall-cupboard.

4. The adjustable anchoring group according to claim 1, wherein the actuation system is adapted to control a movement of the hooking element in the second direction.

5. The adjustable anchoring group according to claim 1, wherein the regulation screw and the first maneuvering pivot are in fixed position along the first direction but but are each rotatable due to two blocking rings, one of the blocking rings being housed in a first annular seat defined in proximity of the upper end of the regulation screw and another one of the blocking rings being housed in a second annular seat defined in a proximity of the lower end of the first maneuvering pivot.

6. The adjustable anchoring group according to claim 5, wherein the actuation system comprises:

a drive screw having an upper end that is accessible from above the hanging bracket device and at least partially housed in the slide, and a second maneuvering pivot having an upper end that engages a lower end of the drive screw and a lower end that is accessible from below the hanging bracket, the second maneuvering pivot being longitudinally aligned with the regulation screw.

7. The adjustable anchoring group according to claim 6, wherein the drive screw is in fixed position along the first direction but is rotatable due to a blocking ring that is housed in a first annular seat defined in proximity of the upper end of the drive screw, and wherein the second maneuvering pivot is in fixed position in the first direction but is rotatable due to a blocking ring that is housed in a second annular seat defined in proximity of the lower end of the second maneuvering pivot.

8. The adjustable anchoring group according to claim 6, wherein the drive screw has a polygonal stem, which extends to engage an interior of a cylindrical element, and a polygonal upper end, wherein the cylindrical element has an external portion shaped as a worm screw that is engaged with a toothed wheel, the cylindrical element and the toothed wheel being housed in the slide, and wherein the hooking element is provided with a partially threaded body that cooperates with a second threaded seat that is defined inside the toothed wheel and that enables a movement of the hooking element in the second direction.

9. The adjustable anchoring group according to claim 8, wherein the partially threaded body has two smooth opposing flat portions sliding inside complementary guiding seats defined in the slide, whereby the hooking element is movable along the second direction, in an extraction/insertion direction with respect to the toothed wheel a following rotation of the toothed wheel.

* * * * *